3,512,663
LOAD SUPPORTING AND TRANSPORTING DEVICE
Martin Guerrico, Paraguay 1142,
Buenos Aires, Argentina
Continuation-in-part of application Ser. No. 594,976, Nov. 15, 1966. This application Feb. 15, 1968, Ser. No. 705,840
Int. Cl. B62g 67/04
U.S. Cl. 214—38          12 Claims

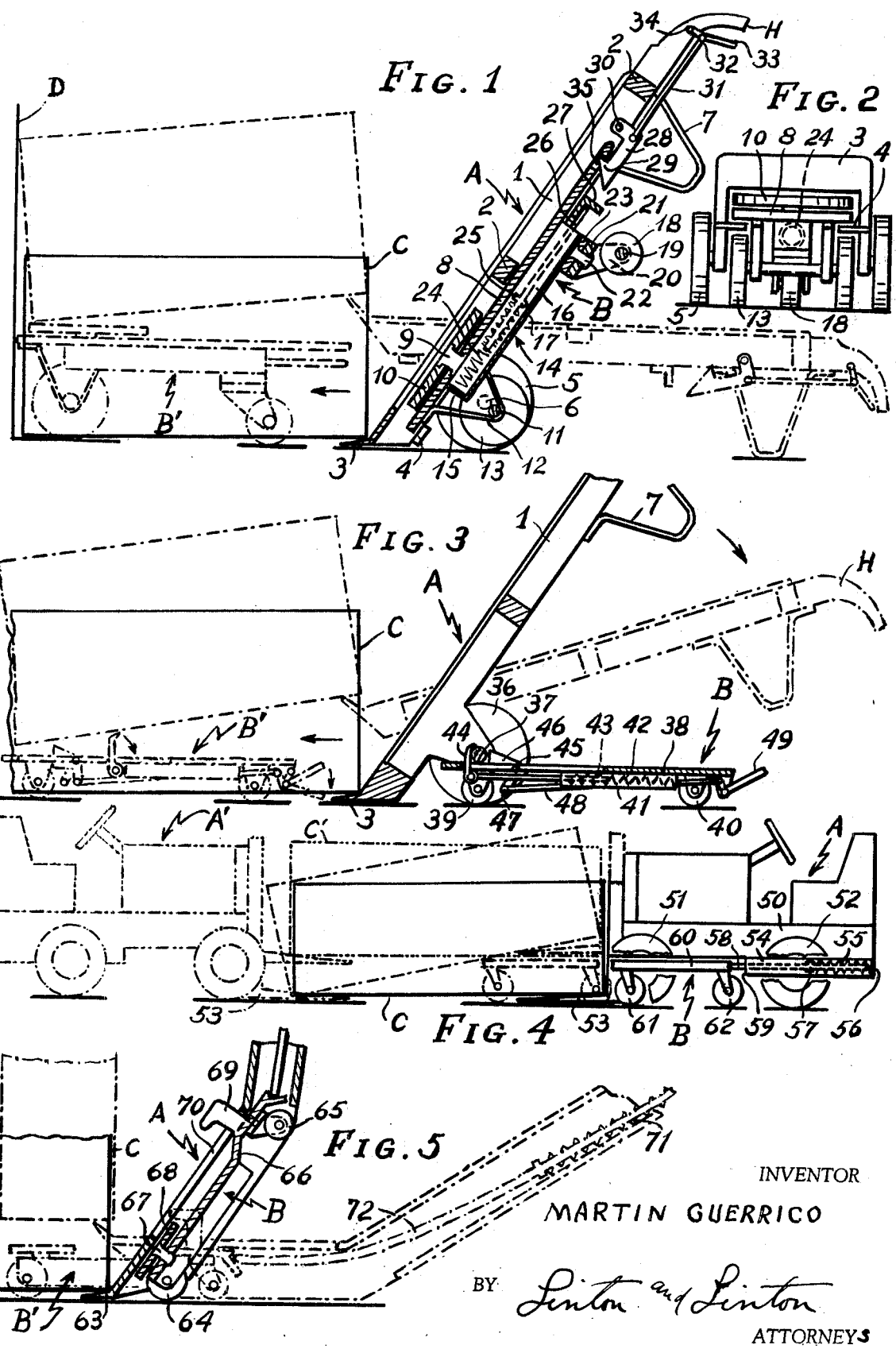

ABSTRACT OF THE DISCLOSURE

This disclosure relates to load lifting and transporting devices. The invention provides a self-supporting wheeled carriage for use in combination with a warehouse truck an automotive lift truck or the like, which is arranged to be releasably retained underneath the truck frame or platform. The truck is provided with means for releasing the carriage from its retained position, and means for ejecting the wheeled carriage under a lifted load in response to the release of the carriage retaining means. This permits an operator to push or pull the load to the desired location while same is resting on the transporting wheeled carriage, without requiring the aid of the truck which can thus have a separate carriage coupled thereto and used for lifting another load and placing the latter carriage thereunder, in load transporting position, or assigned to other duties.

---

This invention is a continuation-in-part of copending application Ser. No. 594,976, filed on Nov. 15, 1966.

The invention relates to a novel load transporting means for use in combination with load-lifting lever means such as warehouse trucks or the like, or with load raising means such as lift trucks.

In order to raise a load by means of a warehouse truck, the operator raises the handle end of the truck frame, slides the angular toe member between the bottom of the load and the surface supporting same and then lowers the handle end of the frame, creating a lever action with the truck wheels as fulcrum, which will raise the load. The load thus lifted can be transported by sustaining the weight thereof at the handles. This method of lifting and transporting is generally satisfactory in the case of loads which are relatively light in weight and small in size, but cannot be used safely for handling loads which are very heavy and/or bulky.

Industrial lift trucks or the like are in turn generally not suitable for transporting extremely heavy and bulky loads unless they are specially designed for such purpose.

An object of the present invention is to provide a load supporting and transporting device for use in combination with a load lifting lever means, a warehouse truck, an industrial lift truck or the like, which will be particularly sutable for handling bulky and/or heavy loads.

A further object of the invention is to provide a load supporting and transporting device which will be capable of being placed automatically under a load lifted by a warehouse truck and which will thereafter not require the use of such truck for supporting and/or transporting the load, whereby the truck will be available for use elsewhere.

A still further object of the invention is to provide a load supporting and transporting device for use in combination with an industrial lift truck or the like, which will permit the transportation of extremely bulky and heavy loads, even when such truck is not designed for supporting the full weight thereof.

Other objects and advantages of the invention will become apparent from the following description of some of the preferred embodiments thereof.

In order that the invention may be more clearly understood and readily carried into practice, some of the presently preferred embodiments thereof have been illustrated by way of example in the accompanying drawings, in which:

FIG. 1 is a longitudinal sectional view of a combination warehouse truck and load supporting and transporting device in accordance with the present invention;

FIG. 2 is a front somewhat schematic view showing the manner in which the load supporting and transporting device is initially housed underneath the warehouse truck in the embodiment shown in FIG. 1;

FIG. 3 is a longitudinal sectional view of a modified embodiment of the invention shown in FIG. 1;

FIG. 4 is a somewhat schematic partly sectional side view of a lift truck incorporating a load supporting and transporting device in accordance with the present invention; and FIG. 5 is a fragmentary longitudinal sectional view of a combination load lifting and transporting device in accordance with a modified embodiment of the invention.

Referring first to FIGS. 1 and 2 of the drawings, the combination load lifting and transporting vehicle according to the present invention is shown to comprise a warehouse truck A and a load supporting and transporting carriage B.

The warehouse truck A comprises a generally rectangular frame formed by a pair of longitudinal frame members 1 and at least two cross members 2, said truck frame having an angular toe member 3 at one end and a pair of spaced handle portions H at the opposite end thereof. At a short distance inwardly of the toe member 3, the truck frame is provided with a pair of supporting elements 4 and a pair of wheels 5 mounted on spindles 6 supported by the frame members 1 by any suitable conventional means. A pair of depending generally U-shaped leg members 7 are secured to the underside of the truck frame members 1.

The load supporting and transporting carriage B comprises a metal mounting plate 8 having fixed thereto an upstanding spindle member 9 engaging a central hole of a load-supporting revolving plate or turntable 10. A fixed axle 11 is mounted on a pair of lug-like members 12 each depending from one side of the plate 8, the ends of said said axle 11 extending outwardly beyond the members 12 and each carrying a wheel 13 rotatably mounted thereon. These wheels 13 are located below the turntable 10 which is adapted to support a load C such as a heavy box or crate.

A relatively narrow box-like metal member 14 comprising front and rear end walls 15, side walls 16 and a bottom wall 17 is firmly secured to the underside of the metal plate 8, as by welding the free edges of said end and side walls thereto at a position midway between the sides of plate 8 and inwardly spaced from the front and rear ends thereof, with the front end wall 15 directed towards the front or toe end of the truck A.

The underside of the bottom wall 17 of the box-like member 14, carries at the rear end thereof a swivel caster 18 the caster pins 19 of which are rotatably mounted on a U-shaped support 20, the cross arm 21 of which is provided with a pivot pin 22 extending through a hole in a disk-like plate 23 fixed to said underside of the bottom wall 17.

A coil compression spring 24 is housed within the box-like member 14. The front end of the spring engages the front wall 15 of member 14, whereas the rear end of the spring engages a head 25 provided on the inner end of a rod member 26 extending outwardly through a hole (not shown) in the rear end wall 15 of member 14. The outer end of the rod member 26 is adapted to engage a stop member constituted, for example, by an angle bar 27 extending across the truck frame and secured to the underside of the longitudinal members 1 thereof.

A catch 28 having a forward tooth 29 is pivoted at its upper rear portion, as at 30, to the inner face of one of the truck frame members 1. The rear lower portion of the catch 28 is connected to one end of a rod member 31 the other end 32 of which is connected to a hand lever 33 pivoted as at 34 to said truck member 1. The rear end corner of the mounting plate 8 is formed with an opening 35 capable of being engaged by the catch tooth 29. A similar catch arrangement may be provided on the other longitudinal member 1 of the truck frame.

The assembly as illustrated in FIG. 1 operates as follows: The carriage B is moved rearwardly between the truck wheel supports until the catch tooth 29 engages the hole 35 in the mounting plate 8. This movement of the carriage B will simultaneously cause the rod 26 to abut against the stop 27, whereby further movement of the carriage until the catch tooth 29 engages the hole 35 will compress the spring 24. The carriage B will thus be retained under the truck A on the supports 4 and angle bar 27. When it is desired to raise and transport a load C, the truck is first placed in an inclined position as shown in full lines FIG. 1, so that the forward end of the angular toe 3 will lie flat on the floor. The truck is then moved forward until said tow end is placed under the load, whereupon the truck is moved angularly downwards to a substantially horizontal poisiton as shown in dot-and-dash lines, in which the load C will have been raised to a position also shown in dot-and-dash lines. With the assembly in this position, a movement of the free end portion of the hand lever 33 towards the truck handle H will release the catch 28, whereupon the carriage B will be ejected forwardly under the load C by the action of the compressed spring 24, the load being supported on the turn table 10. The load C, supported by the carriage B', may thus be pushed or drawn to any desired location.

If desired, any well known means may be provided for retaining the released carriage B connected to the warehouse truck A so that transportation of the load may be carried out through said truck. Also, in case of relatively long loads, the raising thereof to a position in which the carriage B will remain substantially centrally thereof will be facilitated if the load C is initially adjacent a wall D, whereby the rear end of the load being raised will slide upwardly against the wall D and form a less acute angle with the floor.

FIG. 3 illustrates a modified embodiment of the invention. In this instance, the truck A carries a pair of wheels 36 each mounted at one end of a fixed axle 37.

The load supporting and transporting carriage B comprises a supporting platform 38 having a pair of front wheels 39 and a rear wheel 40 which may also be of the revolving type. The wheels 39 and 40 are smaller in diameter than in the embodiment of FIG. 1, so that with the truck A in horizontal position, the carriage B will pass freely between the truck wheel axle 37 and the floor. Fixed to the underside of the platform 38 is a metal box-like member 41, which is similar in construction and position to the box-like member 14 in the embodiment of FIG. 1. In this embodiment the box-like member 41 also houses a coil expansion spring 42, one end of which is fixed to the rear closed end of the member 41, the opposite end of the spring engaging the inner end of a rod 43 extending outwardly of said member 41 and terminating at the other end in a collapsible finger 44. Pivoted to the platform 38 as at 45 is a trigger means comprising an angular lever one arm 46 which is adapted to extend above the platform 38 through an opening therein, so as to constitute a releasable means for retaining the carriage B under the truck A. The other lever arm 47 is directed downwardly and connected to one end of a rod 48, the other end of which is articulated to a pedal lever 49.

Thus, with the spring 42 in expanded condition and the carriage B retained by means of the finger 44 and lever arm 46 between opposite sides of the truck axle 37, once the load C has been raised in a manner similar to that described in connection with the embodiment of FIG. 1, it will be sufficient to depress the pedal 49 to move the lever arm 46 angularly downwards and thus release the carriage B which will be rolled to a position B' under the load C through the force of the expansion spring 42.

FIG. 4 illustrates the application of a load supporting and transporting carriage B to an industrial lift truck. As shown, the vehicle A comprises a truck frame 50 on which are mounted a pair of front wheels 51, a pair of rear wheels 52 and a load-lifting fork or platform 53.

Fixed to the underside of the truck frame 50 is a box-like member 54 housing therein a compression coil spring 55 adapted to be compressed between the rear end wall 56 of member 54 and the slidable head 57 of a spring-compressing rod 58 projecting forwardly through a hole in the front end wall 59 of said box-like member 54.

The load supporting and transporting carriage B comprises a load-supporting platform 60 carrying a pair of front casters 61 and a pair of rear casters 62. The size of the carriage B is such that it can be moved freely between the underside of the truck frame 50 and the floor, and also between the two front wheels 51 of the truck A, the height of the carriage B being preferably such that when same is moved under the truck from the front of the latter, the rear end of the load-supporting platform 60 will engage the forwardly projecting end of the rod 58 in order to compress the spring 55. Any suitable means may be provided for retaining and releasing the carriage B under truck A with the spring 55 in a compressed condition. Alternatively, the truck lifting platform 53 may be first raised to a position above the lower portion of the truck frame 50, the carriage B is then moved under the vehicle until the spring 55 is fully compressed, and the platform 53 lowered again to its load lifting position adjacent the floor, whereby the truck platform frame will retain the carriage B ready to be ejected forwardly under a load C by the spring 55 when the lifting platform 53 is again raised to a position above the height of said carriage B.

When the load C is of a size and/or weight capable of being handled by the truck A, the carriage B can be ejected under the load and transported thereon by pushing or drawing same by hand, whereby a single truck A can be used for lifting a plurality of loads and placing a supporting and transporting carriage B under each of them, if a plurality of carriages B is available.

In the case of an oversize and/or overheavy load C, i.e., a load exceeding in size and/or weight the rated capacity of the truck A, the assembly of FIG. 4 can be used by first raising one end of the load C and ejecting thereunder the carriage B, as shown in dot-and-dash lines at the right-hand side of the drawing. The truck A is then moved so that it will face the opposite end of the load, to position A', the lifting platform 53 is placed under said opposite end of the load C and the latter raised to a height C' approximately level with the end supported by the carriage B, as shown in two-dots-and-dash lines at the left of FIG. 4, whereupon the oversize and/or overheavy load can be readily pushed by the truck to any desired location.

FIG. 5 shows a combined load lifting and transporting unit wherein the warehouse truck is substituted by a frame A forming an obtuse angle and having a front angular toe member 63 and a rear handle (not shown).

The carriage B comprises a pair of front wheels 64, initially acting as a fulcrum in lifting the load C, and a rear caster 65 mounted on a supporting frame 66. A spindle 67 near the front end of the supporting frame 66 engages a central hole in a load-supporting turntable 68. Upstanding from the rear portion of the supporting frame 66 is a headed projection 69 engaging a guide slot 70 formed in one of the walls of the frame A. The underside of the frame A is provided, as in the previous embodiments, with a box-like member housing a compression spring 71, serving for thrusting the carriage B forwards by means of the ejector rod 72, until the projection 69 engages the front end of the slot 70, as shown in dot-and-dash lines. The carriage at position B' with the load C supported thereon can then be pulled and guided by means of the frame A, or the latter can be released from the carriage B and the load pushed while supported by said carriage.

While some of the presently preferred embodiments have been shown and described in detail, it will be understood that many changes and/or modifications will occur to those skilled in the art. For example, it will be readily understood that some of the features shown in one of the embodiments can be used in place of or in addition to those in another embodiment, and vice-versa. Consequently, the scope of the invention is set forth in the appended claims.

What I claim is:

1. A load lifting and transporting assembly comprising, in combination, a truck comprising a truck frame having a front end angular toe member and a pair of front wheels rearwardly of said toe member, a wheeled load supporting and transporting platform freely movable to and from a position underneath said truck frame when said truck frame is in a substantially horizontal position, means for releasably retaining said wheeled platform underneath said truck frame, spring means for ejecting said wheeled platform forwardly from underneath said truck frame when said retaining means are released, and means for releasing said retaining means.

2. A load lifting and transporting assembly as claimed in claim 1, wherein said spring means comprises a spring housing fixed to the underside of said truck frame, a compression coil spring in said housing, and spring-compressing means engageable by said load supporting and transporting platform.

3. A load lifting and transporting assembly as claimed in claim 1, wherein said wheeled load supporting and transporting platform comprises a mounting plate member having a pair of front wheels and a rear caster depending therefrom, and a load-supporting turntable on said mounting plate.

4. A load lifting and transporting assembly as claimed in claim 1, wherein said means for releasing said platform retaining means are connected to said truck frame.

5. A load lifting and transporting assembly, comprising a substantially rectangular frame having an angular toe member at one end and a fulcrum rearwardly of said toe member, a load supporting and transporting platform having a pair of front wheels and at least one rear wheel, said wheeled platform being movable to and from a position underneath said frame, means for releasably retaining said wheeled platform underneath said frame in a position wherein said platform front wheels will initially constitute said fulcrum, spring means for ejecting said wheeled platform from underneath said frame when said retaining means are released, and means for releasing said retaining means.

6. A load lifting and transporting assembly as claimed in claim 2, comprising releasable means connecting the ejected wheeled platform to said frame.

7. A load supporting and transporting carriage for use in combination with a warehouse truck having a pair of front wheels mounted at the ends of an axle, comprising a load supporting platform, a pair of front wheels and a rear caster wheel mounted on said platform, the height of said wheeled platform being less than the distance between said truck wheel axle and the ground, releasable means for retaining said wheeled platform undereneath said truck wheel axle, spring means for ejecting said wheeled platform forwardly, said spring ejecting means being connected to said retaining means, and means mounted on said wheeled platform for releasing said retaining means.

8. In an automotive lift truck having a frame, a pair of front wheels, a pair of rear wheels and a load-lifting platform at the front of said front wheels, a spring housing fixed to the underside of said truck frame, a compression coil spring in said housing, spring-compressing means slidable in said housing and projecting forwardly therefrom, a wheeled load supporting platform movable to and from a position underneath said truck frame, between sail truck front wheels, wherein said coil spring is compressed, means for retaining said wheeled load supporting platform in said position, and means for releasing said wheeled load supporting platform for ejection by said compression coil spring.

9. The assembly as claimed in claim 8, wherein said wheeled load supporting platform comprises a pair of front casters and a pair of rear casters.

10. A load-supporting and transporting carriage for use in combination with a load-lifting lever having a pair of braced longitudinal frame members, a fulcrum and a cross-bar near said fulcrum, comprising a load supporting platform, a pair of front wheels and at least one rear wheel mounted on said platform, an elongated spring housing secured to the underside of said platform, expansion spring means in said housing, spring expansing means engaging said spring means and projecting forwardly from said housing, trigger means mounted on said platform and connected to said spring expansing means, said trigger means being adapted to engage one side of said load-lifting lever cross bar for retaining said spring means in expanded condition, collapsible stop means on said platform, adapted to engage the opposite side of said load lifting lever cross bar, and means for releasing said trigger means for said cross bar.

11. A load supporting and transporting carriage as claimed in claim 10, comprising a turntable on said platform.

12. A load supporting and transporting carriage as claimed in claim 10, wherein at least one of said wheels in a caster wheel.

References Cited

UNITED STATES PATENTS 3,168,956  2/1965  Jinks et al. _____ 214—730

FOREIGN PATENTS 741,026  2/1933  France.
989,391  4/1965  Great Britain.

LEO FRIAGLIA, Primary Examiner

J. A. PEKAR, Assistant Examiner

U.S. Cl. X.R.

214—372; 254—8; 280—47, 29